(12) United States Patent
Comp

(10) Patent No.: US 7,280,817 B2
(45) Date of Patent: Oct. 9, 2007

(54) NETWORK BASED ARCHIVING OF USER-SPECIFIC INFORMATION IN A COMMUNICATION SYSTEM

(75) Inventor: Lynn A. Comp, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 10/190,100

(22) Filed: Jul. 3, 2002

(65) Prior Publication Data

US 2004/0203579 A1 Oct. 14, 2004

(51) Int. Cl.
*H04M 11/00* (2006.01)
*H04M 1/725* (2006.01)
*H04M 1/00* (2006.01)
*H04L 12/58* (2006.01)

(52) U.S. Cl. .............. 455/406; 379/355.04; 455/412.1

(58) Field of Classification Search ........ 455/405–410; 379/219, 355.02–356.01
See application file for complete search history.

(56) References Cited

U.S. PATENT DOCUMENTS

| | | | | |
|---|---|---|---|---|
| 5,506,893 A | * | 4/1996 | Buscher et al. | 379/115.02 |
| 5,781,908 A | * | 7/1998 | Williams et al. | 709/223 |
| 6,049,713 A | * | 4/2000 | Tran et al. | 455/415 |
| 6,073,141 A | * | 6/2000 | Salazar | 707/204 |
| 6,115,458 A | * | 9/2000 | Taskett | 379/114.2 |
| 6,639,975 B1 | * | 10/2003 | O'Neal et al. | 379/112.01 |
| 6,731,625 B1 | * | 5/2004 | Eastep et al. | 370/352 |
| 6,798,872 B1 | * | 9/2004 | Matsumoto et al. | 379/142.01 |
| 2002/0019225 A1 | * | 2/2002 | Miyashita | 455/412 |

* cited by examiner

*Primary Examiner*—Duc M. Nguyen
*Assistant Examiner*—Michael Thier
(74) *Attorney, Agent, or Firm*—Schwegman, Lundberg & Woessner, P.A.

(57) ABSTRACT

User-specific information (e.g., call log information, contact information, etc.) normally stored within a mobile user device associated with a user is also maintained at one or more network storage locations within a communication system. The information may thereafter be easily transferred from the network storage location(s) to a new user device associated with the user.

4 Claims, 4 Drawing Sheets

NETWORK BASED ARCHIVING OF USER-SPECIFIC INFORMATION IN A COMMUNICATION SYSTEM

BACKGROUND OF THE INVENTION

A mobile user device, such as a cellular telephone or a pager, is often capable of storing information that is specific to the user associated with the device. This may include, for example, information relating to personal contacts of the user (i.e., contact information) and information relating to calls that the user recently participated in (i.e., call log information). Having such information within the user device can provide many conveniences to the user. For example, if the user has to contact a business associate from a remote location and does not remember the party's telephone number, the number can be easily retrieved from a memory within the user device (assuming the user has previously programmed the number into the device). The user device may also be capable of automatically dialing the party's telephone number for the user. If the user wants to contact a party with whom he/she just spoke the previous day, the telephone number of the party may be easily retrieved from the call log in the user device. Automatic dialing of call log listed numbers may also be provided. When a user purchases a new user device (e.g., when an old device is lost, stolen, damaged, or outdated), the new device will not have the user-specific information stored therein. Thus, if the user wants to have access to his/her contact information, the user will typically have to remember and manually enter the contact information in the new user device. The call log information will usually be irretrievably lost.

DETAILED DESCRIPTION

Figure 1:
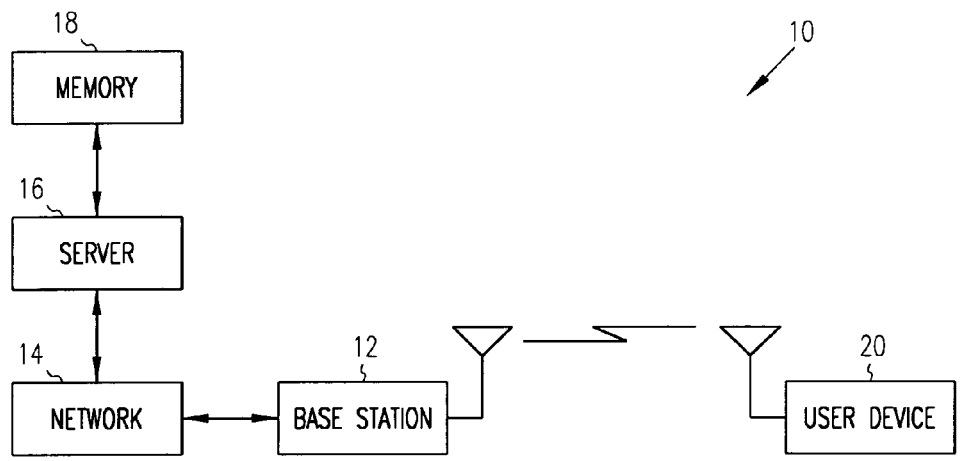
FIG. 1 is a block diagram illustrating a communication system in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures for use within a communication system to provide additional, convenience-enhancing services to mobile users. User-specific information (e.g., call log information and/or contact information) normally stored within a mobile user device associated with a user is also maintained at one or more network storage locations within the system. Thus, should the user's communication device be lost, damaged, or stolen, or should the user simply desire to trade up to a new device model, the user-specific information may be easily downloaded to a new user device from the network storage location(s). In this manner, the process of acquiring and configuring a new user device may be made simpler and more convenient for a user. In at least one embodiment, the maintenance of user-specific information within the network is offered to users on a subscription basis.

FIG. 1 is a block diagram illustrating a communication system 10 in accordance with an embodiment of the present invention. The communication system 10 may be part of a larger (e.g., cellular-based or satellite-based) communication system for providing communication services to mobile users. As illustrated, the communication system 10 includes: a base station 12, a network 14, a server 16, a memory 18, and a user device 20. The user device 20 may comprise any form of portable communication device having wireless transceiver functionality including, for example, a mobile telephone (e.g., a cellular telephone, a handheld satellite communicator, etc.), a personal digital assistant, a pager, and others. The base station 12 provides wireless access to the network 14 for the user device 20. The base station 12 may also provide access to the network 14 for one or more other user devices (not shown) within the coverage region of the base station 12. One or more other base stations may also be coupled to the network 14 to provide wireless access thereto for corresponding users. In this manner, communication connections may be established and maintained between mobile users within the communication system 10. The network 14 may also be coupled to one or more external networks (e.g., the public switched telephone network, the Internet, etc.) to allow communication connections to be established and maintained between a mobile user in the communication system 10 and one or more entities outside of the communication system 10. It should be appreciated that the communication system 10 of FIG. 1 is merely exemplary of a system in which the inventive principles may be practiced. Many alternative system architectures may also be used.

The server 16 is coupled to the network 14 for providing one or more network functions and/or user services within the communication system 10. The server 16 will typically include one or more digital processing devices (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others) to facilitate performance of its corresponding functions/services. The memory 18 includes a digital storage medium that may be used by the server 16 in providing some or all of its corresponding functions/services. The memory 18 may include any form of digital storage device including, for example, a semiconductor memory device, a magnetic disk drive, an optical drive, or others, including combinations of the above. In at least one embodiment, as shown in FIG. 1, the memory 18 is co-located with the server 16. In another embodiment, the memory 18 is accessed by the server 16 through the network 14.

Figure 2:
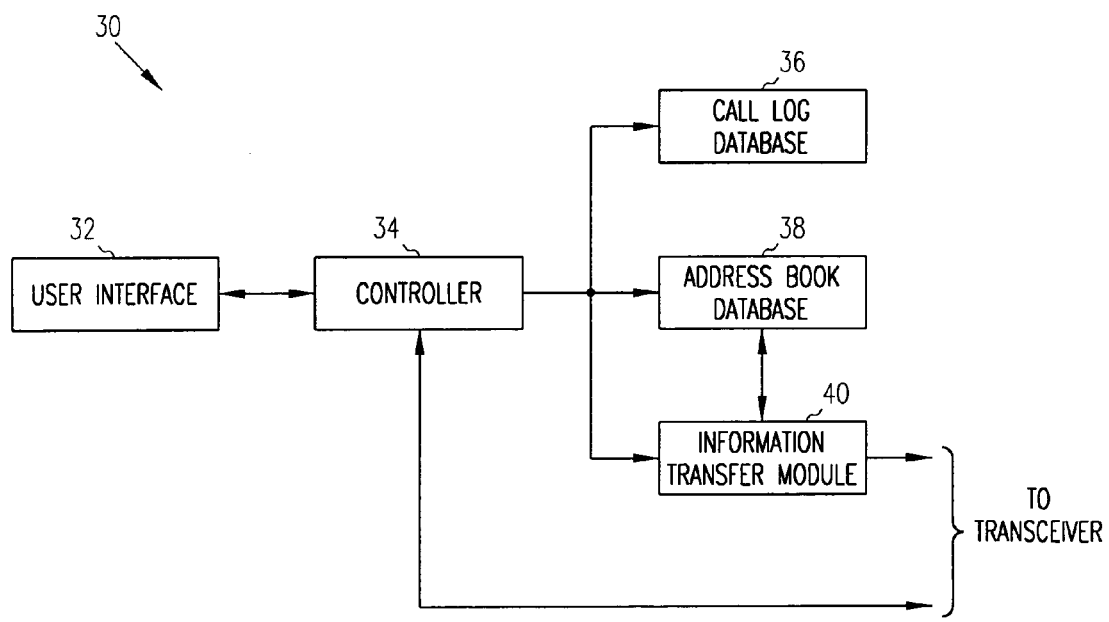
FIG. 2 is a block diagram illustrating a user device in accordance with an embodiment of the present invention.

FIG. 2 is a block diagram illustrating a user device 30 in accordance with an embodiment of the present invention. The user device 30 may be used, for example, within the communication system 10 of FIG. 1. As illustrated, the user device 30 includes: a user interface 32, a controller 34, a call log database 36, an address book database 38, and an information transfer module 40. The user interface 32 provides an interface between the user device 30 and a corresponding user. As such, the user interface 32 may comprise any of a number of different input and/or output devices including, for example, a display, a keypad, a speaker, a microphone, control buttons, a keyboard, a mouse, a touch pad, and/or others. The controller 34 controls the operation of the user device 30 and may also provide for information processing and transfer between the user interface 32 and a corresponding wireless transceiver. The call log database 36 includes a data storage medium in which call log information is stored within the user device 30 for a corresponding user. The call log database 36 may include call-related information for a predetermined number of previous calls that were placed from and/or received through the user device 30. The call log database 36 will typically include the phone numbers of the other parties involved in the corresponding calls. Party names and/or other information (e.g., length of call, etc.) may also be stored. The controller 34 may control the maintenance of the call log database 36 or a separate control unit can be provided.

The address book database 38 includes a data storage medium in which user-specific contact information is maintained. A user may make additions to and/or deletions from the address book database 38 by activating an appropriate function within the controller 34 and then manually entering or deleting contact information using an input device (e.g., a keypad). The address book database 38 will typically include the telephone numbers and names of contacts specified by the user. Other contact-related information may also be stored in the address book database 38.

The information transfer module 40 is operative for automatically transferring contact information from the address book database 38 of the user device 30 to a network based storage location within the communication system. The information transfers may take place at one or more predetermined times, which may be specified by the user. In one approach, the user specifies a timing criterion for performing transfers at the time the automatic information transfer function is first activated within the user device 30. For example, the user may program the user device 30 to make transfers at periodic intervals (e.g., at 10:00 PM every Monday, at 10:00 PM every last day of the month, etc.). A menu of timing options may be presented to the user to make the entry of a timing criterion easier. Once appropriately configured, the information transfer module 40 will cause the required transfers of contact information to be made at the predetermined times. An internal clock may be monitored to determine the present time. The information transfer module 40 may transfer all of the contact information from the address book database 38 to the corresponding network storage location each time a transfer is made or only a portion of the information (e.g., information that has changed since a previous transfer operation). In one embodiment, the functions of the information transfer module 40 may be activated and deactivated by the user using an appropriate input device. The information transfer module 46 may be implemented in a variety of different ways, including both software and hardware implementations. In at least one embodiment, for example, the information transfer module 40 is implemented in software within the controller 34.

In one approach, the information transfer module 40 will first call an appropriate network server in the system, at the predetermined time, to request a transfer of contact information to the network. After an authentication procedure, the network server may then manage the transfer and storage of the contact information to the appropriate network storage location. As will be described in greater detail, in at least one embodiment, a user is required to subscribe to an address book autosync service (e.g., for a small monthly fee) before automatic information transfers will be supported by the network. In addition to, or as an alternative to, automatic transfers of contact information, a user may be able to initiate a transfer of contact information to the network server location manually. For example, a user can manually place a call to a network server requesting a transfer and, after appropriate authentication, the network server can allow the transfer to proceed. Such capability may also require a subscription to an appropriate service. As will be appreciated, other techniques for carrying out the transfer of contact information from a user device to a network storage location may alternatively be used.

Figure 3:
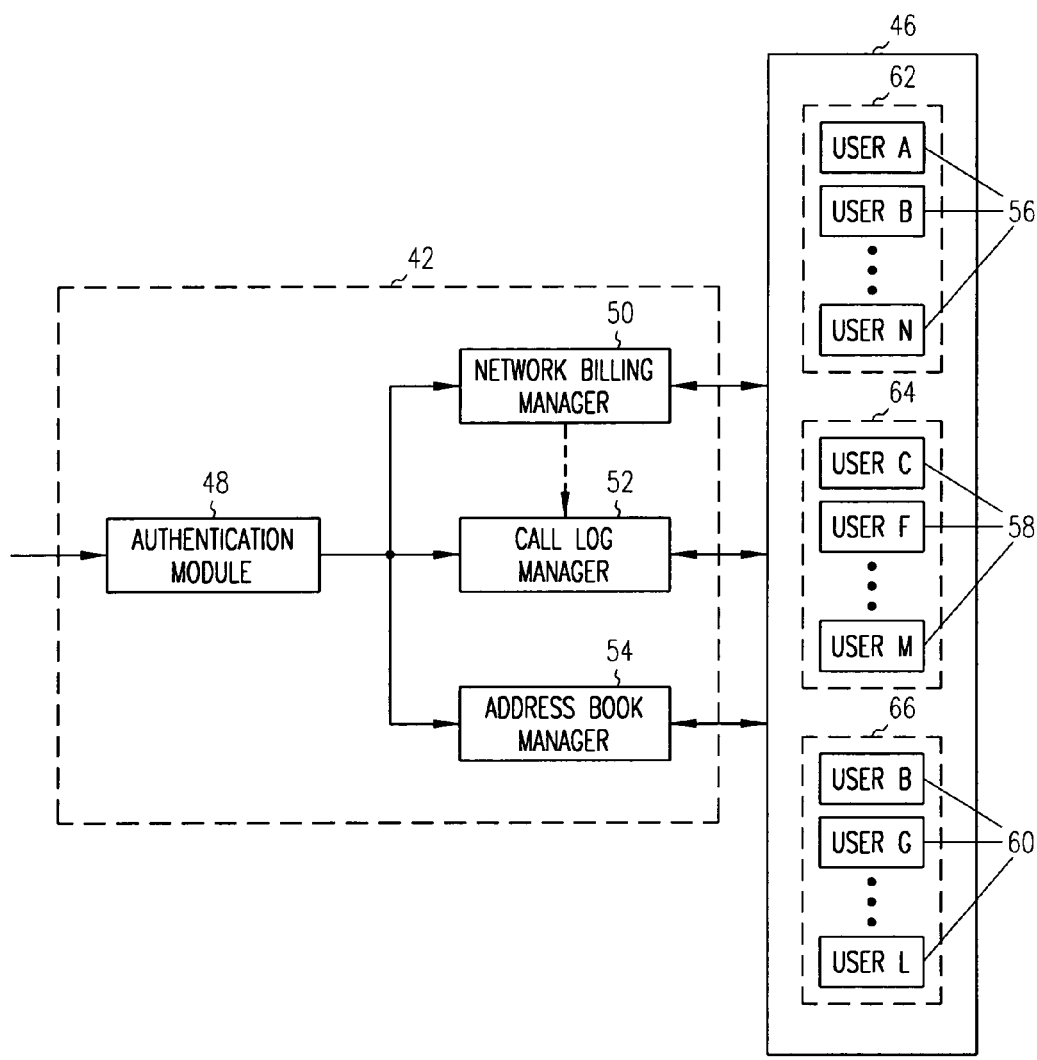
FIG. 3 is a block diagram illustrating a network server and associated memory in accordance with an embodiment of the present invention.

FIG. 3 is a block diagram illustrating a network server 42 and associated memory 46 in accordance with an embodiment of the present invention. The server 42 and memory 46 may be used, for example, within the communication system 10 of FIG. 1. The server 42 and memory 46 may be co-located within a communication system or connected through an intervening network (e.g., network 14 of FIG. 1). As illustrated, the server 42 includes: an authentication module 48, a network billing manager 50, a call log manager 52, and an address book manager 54. Other functionality may also be provided. It should be appreciated that the individual blocks illustrated in FIG. 3 (and in other block diagrams described herein) are functional in nature and do not necessarily represent discrete hardware elements. For example, in at least one embodiment, two or more of the functional blocks (or portions thereof) are implemented in software within a common digital processing device (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others). Individual functions may also be divided among multiple digital processing devices.

The authentication module 48 is operative for, among other things, determining the validity of calls within the system. In a typical scenario, a mobile user is required to have a predetermined service agreement in place before outgoing calls can be made from, and incoming calls received by, a corresponding user device. The authentication module 48 may check to determine whether such an agreement is in place when an outgoing or incoming call is detected for a particular user device. If it is found that an agreement is in place, the authentication module 48 may then check to determine whether the user's account is current. Other authentication procedures may alternatively be used. After it is determined that a call is valid, the authentication module 48 will allow the call to proceed. Typically, a base station (e.g., base station 12 of FIG. 1) will first detect an outgoing or incoming call for a particular user device. The base station may then contact the authentication module 48 within the server 42 to authenticate the call. The authentication module 48 may then instruct the base station to either drop the call or allow the call to go through.

The network billing manager 50 is operative for tracking the financial accounts of individual users within the communication system. Often, a mobile user will be charged for both incoming and outgoings calls. Thus, after the authentication module 48 has determined that a particular call is authentic, the network billing manager 50 may record corresponding call information (e.g., user, duration of call, telephone number of other party, etc.) for billing purposes. The recorded information may later be used to prepare a monthly bill for the user based on the user's agreement with the service provider. As shown in FIG. 3, a dedicated storage space 56 may be provided within the memory 46 for the storage of billing information for each user in the system (or in a portion of the system).

The call log manager 52 is operative for maintaining a call log for individual users at a network storage location. The call log maintained for a user by the call log manager 52 will typically include the same or similar information to that stored within a corresponding user device within the system (e.g., within call log database 36 of FIG. 2). That is, the call log may include call-related information for a predetermined number of previous calls associated with the user. The call log may include information relating to telephone calls placed from a user device associated with the user and/or telephone calls received by the user device associated with the user. A call log may be maintained by the call log manager 52 for all users in the system or for selected users. In one approach, a dedicated storage space 58 is provided within the memory 46 for each user for whom a call log is to be maintained. The call log manager 52 may work independently or in conjunction with the network billing manager 50 to assemble the call log information for individual users. Alternatively, the call log manager 52 may simply transfer the appropriate information to the call log of a user from corresponding billing entries in memory 46. As will be appreciated, other methods for assembling and maintaining the call log information may alternatively be used.

In one embodiment, the call log manager 52 only maintains call logs for users who subscribe to a call log service (e.g., for a small monthly fee). When a user initially subscribes to the call log service, a certain amount of memory space may be allocated to the user within the network (e.g., within memory 46) for use in storing the call log. When an authenticated call involving the subscribing user is later detected, the call log manager 52 may record the corresponding call information to the dedicated call log memory space of the user. The call log manager 52 may have to delete a call record from the memory space to make room for the new call information. In one approach, the operation of the call log manager 52 in maintaining a call log is automatic and transparent to the corresponding user.

The address book manager 54 is operative for managing the storage of user-specific contact information for individual users at a network storage location. The user-specific contact information is information that is transferred to the address book manager 54 from a user device associated with the corresponding user. In one approach, as illustrated in FIG. 3, a dedicated storage space 60 is provided at a network location for each user for whom contact information is to be maintained. Contact information may be maintained by the address book manager 54 for all users in the system or for selected users. In one implementation, contact information is only maintained for users who subscribe to an address book autosync service (e.g., for a small monthly fee). When a user subscribes to the address book autosync service, a certain amount of storage space may be allocated to the user within the network (e.g., within the memory 46). The address book manager 54 may thereafter manage the transfer and maintenance of contact information to this storage space for the user.

Transfers of contact information from a user device to the server 42 may be initiated at either the user device or the network. In one approach, as described previously, a user device is programmed to initiate transfers of contact information to the network at predetermined times. When a transfer is to be made, the user device may first place a call to the server 42 requesting storage of contact information at the corresponding network storage location. After the call has been authenticated, the address book manager 54 may take control of the transfer and storage of contact information to the appropriate storage location. In another embodiment, the address book manager 54 initiates the transfer of contact information from a user device to the network storage location by placing a call to the user device. Other methods for managing the transfer of user-specific contact information from a user device to the network may alternatively be used.

The memory 46 may include a single memory device or multiple memory devices. Also, any number of different memory types can be used. Preferably, non-volatile forms of memory will be used to prevent a loss of information should power be lost. As illustrated in FIG. 3, a separate region of the memory 46 (or a separate memory device altogether) may be used for billing information (region 62), call log information (region 64), and contact information (region 66). Alternatively, all information associated with a particular user may be kept together within the memory 46. As will be appreciated, a wide variety of different techniques for organizing and storing the information within a network-based memory structure (or structures) may be used.

In the embodiment of FIG. 3, the network billing manager 50, the call log manager 52, and the address book manager 54 are all located within a common server 42. It should be appreciated that these functions may alternatively be distributed among multiple network servers in a communication system. It should also be appreciated that these functions may each be implemented in a system without one or more of the other functions.

When a user purchases a new user device, the call log and/or contact information stored at the network storage location(s) associated with the user may be conveniently downloaded to the new user device during an initial programming of the device. For example, in a cellular communication system, a vendor will usually program a new cellular telephone for a purchaser to, among other things, associate an identification number of the telephone with a telephone number assigned to the user. This process will typically require communication with a remote network server. During this programming operation, the vendor can perform a transfer of call log information and/or contact information from the corresponding network storage location(s) to the new telephone for the user. A nominal fee may be charged for the transfer(s). In one approach, for example, the vendor may deliver an appropriate request to the call log manager 52 and/or the address book manager 54 to transfer a particular user's information to the new user device. A specific authorization or identification code (or the like) may be required to initiate such transfers. The call log manager 52 and/or address book manager 54 may then retrieve the appropriate information and deliver it to the user device location.

User-initiated transfers of information from the network to a user device may also (or alternatively) be supported. For example, a user may deliver an appropriate request to the call log manager 52 and/or the address book manager 54 to transfer the user's information to the new user device. This may also require a specific authorization or identification code (that the user can get from, for example, the communication service provider).

Because the contact information had been previously stored at a network storage location, the user does not have to recall and manually reenter the information in the new user device. Similarly, because the call log information was stored at the server location, the new user device will have a record of previous calls that it would not otherwise have. The ease and convenience associated with the transfer of the call log and/or contact information to the new user device may encourage more frequent user device upgrades and may also encourage consumer loyalty to the service provider that is storing the information.

Figure 4:
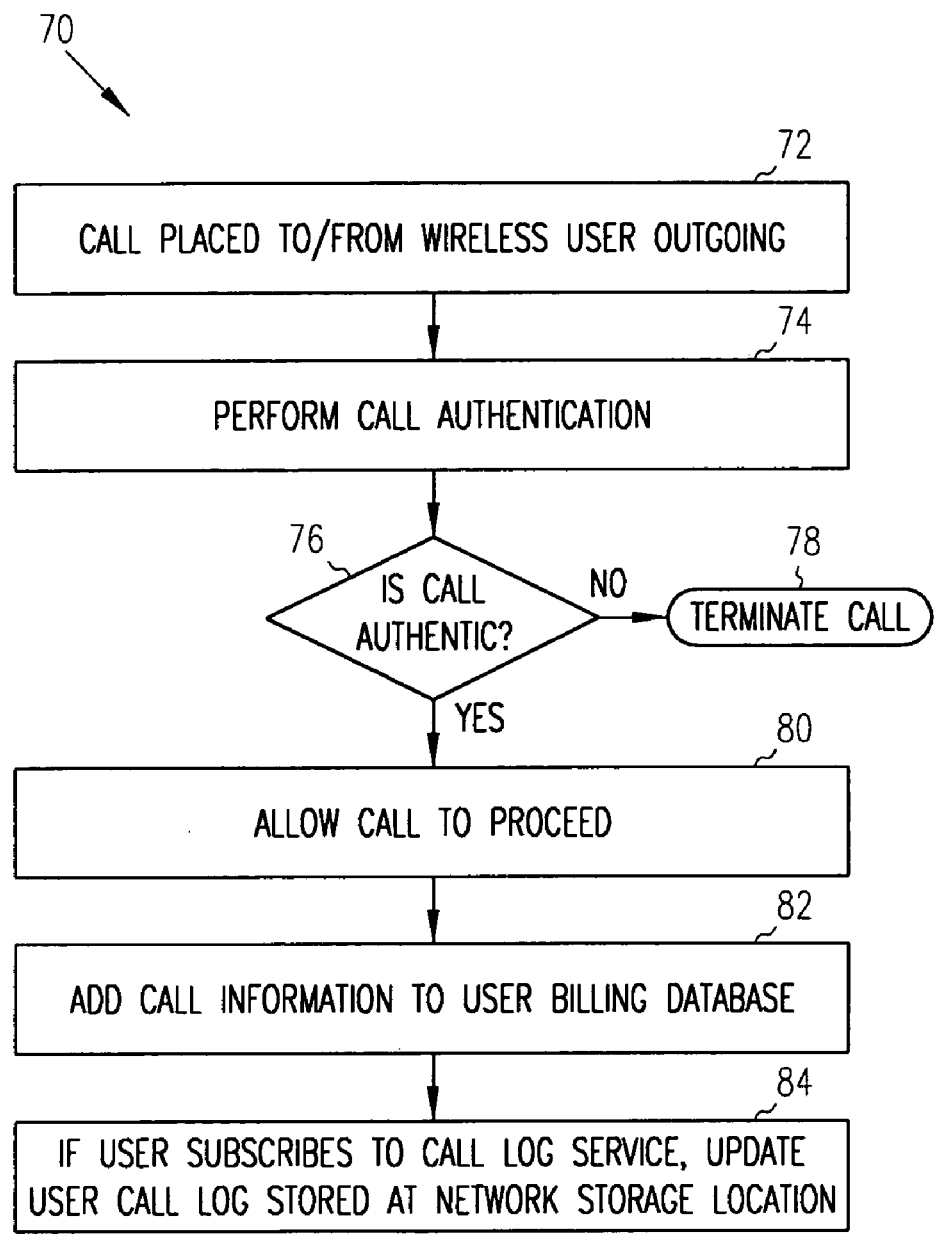
FIG. 4 is a flowchart illustrating a method for processing calls within a communication system in accordance with an embodiment of the present invention.

FIG. 4 is a flowchart illustrating a method 70 for processing calls within a communication system in accordance with an embodiment of the present invention. First, a call is placed to or from a wireless user (block 72). A user authentication process is next performed to determine if the user is valid (block 74). If the user is not valid, the system terminates the call (block 76 and block 78). If the user is valid, the call is permitted to proceed (block 76 and block 80). Information about the call is subsequently added to a user billing database for eventual use in billing the user (block 82). If the user subscribes to a call log service, call information is also stored within a user-specific call log at a network storage location (block 84).

Figure 5:
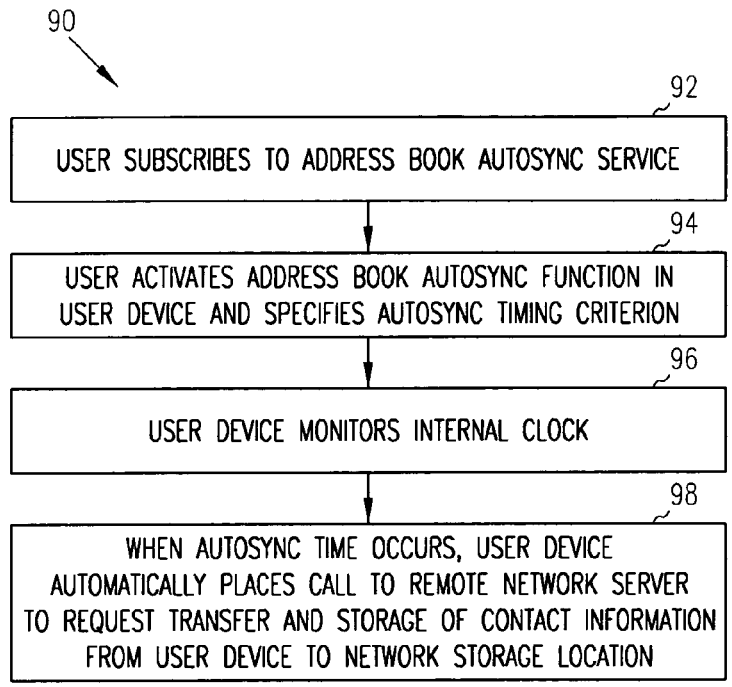
FIG. 5 is a flowchart illustrating a method for performing address book auto-synchronization for a mobile user device in a communication system in accordance with an embodiment of the present invention.

FIG. 5 is a flowchart illustrating a method 90 for performing address book auto-synchronization for a mobile user device in a communication system in accordance with an embodiment of the present invention. A user first subscribes to an address book autosync service offered by a communications service provider (block 92). The user then activates and initiates an address book autosync function on the wireless user device (block 94). During this time, the user may specify an autosync timing criterion for use by the user device (e.g., every Monday at 10:00 PM, etc.). The user device subsequently monitors an internal clock for the appropriate autosync time (block 96). When the autosync timing criterion has been met, the user device automatically calls a remote server in the communication system to request transfer and storage of user contact information to a network-based storage location (block 98).

Figure 6:
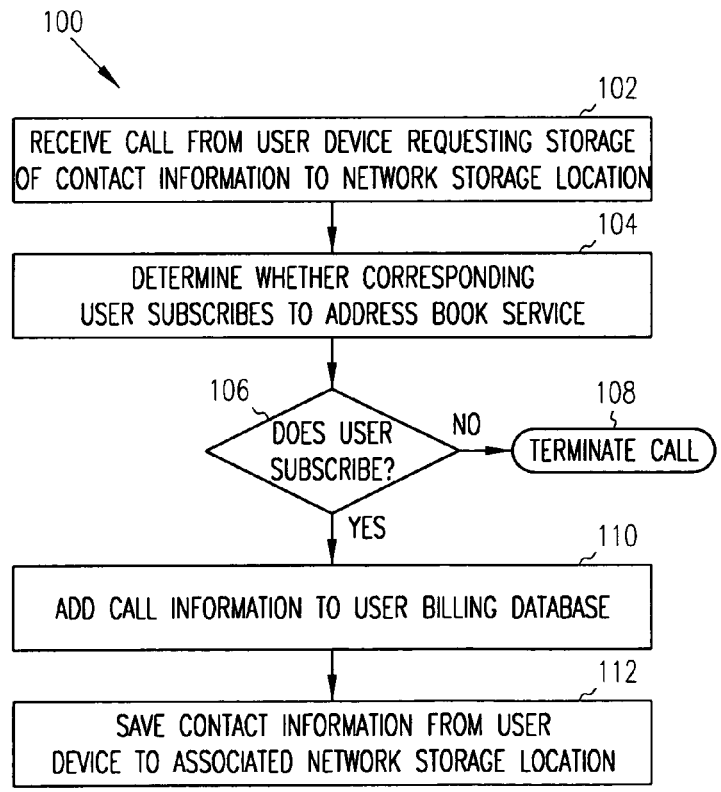
FIG. 6 is a flowchart illustrating a method for use in supporting an address book storage and retrieval service within a communication system in accordance with an embodiment of the present invention.

FIG. 6 is a flowchart illustrating a method 100 for use in providing an address book storage and retrieval service within a communication system in accordance with an embodiment of the present invention. The method may be used in connection with automatic and/or non-automatic information transfers initiated from a user device. A call is first received from a user device requesting storage of user-specific contact information to a network-based storage location (block 102). It is then determined whether a user associated with the user device subscribes to an address book service (block 104). This determination may be made, for example, during a user authentication process. If the user does not subscribe to the address book service, the call is terminated (block 106 and block 108). If the user does subscribe to the service, information relating to the call is added to a user billing database (block 106 and block 110). Contact information is then transferred from the user device to a dedicated network-based storage location associated with the user (block 112).

Although the present invention has been described in conjunction with certain embodiments, it is to be understood that modifications and variations may be resorted to without departing from the spirit and scope of the invention as those skilled in the art readily understand. For example, forms of user-specific information other than contact information and call log information may also be used in accordance with the present invention. Such modifications and variations are considered to be within the purview and scope of the invention and the appended claims.

What is claimed is:

1. A method for supporting an address book storage and retrieval service within a communication system that services mobile users, comprising:

receiving a call from a user device requesting storage, at a network storage location, of user-specific contact information;

determining whether a user associated with the user device is a subscriber to an address book service;

facilitating transfer of user-specific contact information from the user device to a network storage location when it is determined that the user is a subscriber to the address book service;

determining the validity of the call by checking whether a user associated with the user device has an agreement in place allowing outgoing calls to be made from the corresponding user device; and wherein:

determining whether a user associated with the user device is a subscriber includes determining whether the user associated with the user device is one of the selected users of all users having an agreement in place additionally being a subscriber to the address book service separate from the agreement; and facilitating transfer of user-specific contact information includes facilitating transfer of user-specific contact information from the user device to a network storage location when it is determined that the user has an agreement in place and is a subscriber to the address book service.

2. The method of claim 1, wherein:

determining whether the user subscribes to the address book service is performed as part of a call authentication process.

3. The method of claim 1, further comprising:

transferring contact information from the network storage location to another mobile user device associated with the user when an appropriate request is received.

4. The method of claim 3, wherein:

said appropriate request is received from said another mobile user device during an initial programming of said another mobile user device by a vendor.

* * * * *